Aug. 20, 1940.   W. RETHEL   2,212,456
SHELL OR FUSELAGE FOR AIRCRAFT
Filed March 21, 1938
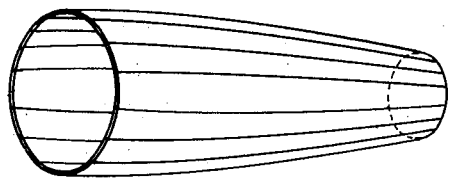
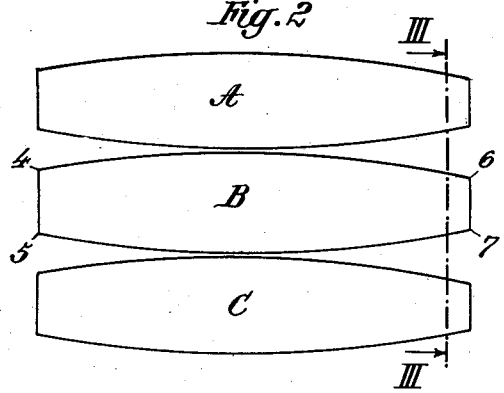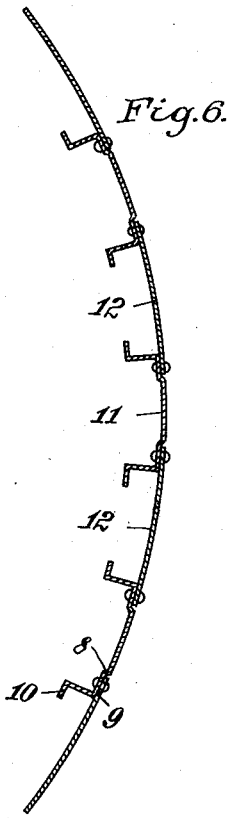
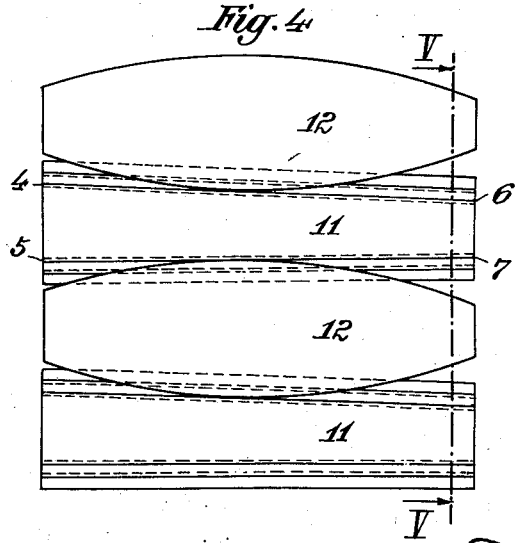
Inventor:
Walther Rethel,
Attorneys Patented Aug. 20, 1940

2,212,456

UNITED STATES PATENT OFFICE 2,212,456

SHELL OR FUSELAGE FOR AIRCRAFT

Walter Rethel, Brandenburg, Germany, assignor to Arado Flugzeugwerke Gesellschaft mit beschrankter Haftung, Nowawes, Potsdam, Germany Application March 21, 1938, Serial No. 197,266
In Germany September 16, 1937

3 Claims. (Cl. 244—119)

The present invention relates to a monocoque fuselage for aircrafts consisting of longitudinal metal sheets connected together by riveting or welding. The invention further relates to a method for the manufacture of such fuselages.

The problem to be solved by the invention is to provide a method allowing the production of known shell bodies under manufacturing conditions offering the following advantages: Obviation of any warping forces, but maintaining a strake free of objection, employment of normal machine tools, obviation of the use of special machines, provision of standardized semi-finished products useable for various types of fuselages, possibility of mechanical riveting and electrical welding respectively, for instance point welding, and, furthermore, employment of sheet material for the outer skin.

With the known constructions of fuselages of the kind mentioned above, the edges of the longitudinal metal sheets extend in a flat arc due to the doubly curved shape of the fuselage. To obtain a strake with strength in the row of rivets, a stiffening member must be arranged below each row of rivets, although the total number of stiffening members used is not required for the sake of stability or rigidity. Moreover, care must be taken, that the three parts to be connected together, i. e. the two adjacent sheets and the stiffening member, occupy quite a definite, and exact position, which requires special care and therefore is time consuming.

According to the invention all the disadvantages mentioned above are obviated, whereas the above enumerated manufacturing advantages are obtained.

The object aimed at is substantially achieved by the fact, that the body or fuselage of the aircraft is composed of longitudinal metal sheets which alternately consist of sheets having a profiled section and smooth sheets.

The profiled sheets are cut in the form of slender trapezoids. The length of the small sides or ends of the trapezoids is, determined by the division of the two end ribs or frames of the fuselage resulting from the number of sheets used. To this length there must be added a small amount as the sheet is bent to form a shoulder.

The smooth sheets are cut in the form of staves, the ends of which are determined by the division of the two end frames or ribs of the fuselage resulting from the number of the metal sheets employed. The degree of the curvature along the longitudinal edges of the sheets is determined by the curvature of the fuselage, and the addition of amounts about which the trapezoid-shaped profiled sheets, without considering the addition to be made for forming shoulders, differ from their stave form resulting by a uniform subdivision of the upper surface of the body or fuselage.

With bodies or fuselages constructed in this manner, the shoulders in the metal sheets having a channel shaped section may be made in a straight line, although the upper surface of the body or fuselage is arched or curved. It is, therefore, not necessary to provide shoulders extending in a curve or an arc.

In the accompanying drawing one construction according to the invention is shown by way of example.

In this drawing:

Fig. 1 is a general perspective view of a fuselage of an aircraft made according to the invention, Fig. 2 is a development of the surface of the fuselage in a plane showing the stave form of the individual longitudinal strips, Fig. 3 shows part sectional views on the line III—III of Fig. 2, Fig. 4 shows the manner of cutting the individual longitudinal sheets according to the invention, Fig. 5 is a section on the line V—V of Fig. 4, and Fig. 6 is a cross section through a portion of a wall of the finished fuselage.

If the upper surface of the fuselage is subdivided into a number of equal longitudinal strips, as shown in Fig. 1, and if the development of this surface is placed in a plane, it will be seen, that these longitudinal strips A, B, C have the form of staves represented in Fig. 2. The length of the ends is determined by the division of the two end ribs or frames of the fuselage resulting from the number of sheets used. The two end ribs or frames are diagrammatically shown in Fig. 1 by the two ellipses.

From these sheets the sheets used in the instant invention are obtained. As shown the four corners of each second or alternate sheet, i. e. for instance the corners 4 and 6 and the corners 5 and 7 of the strip B shown in Fig. 2, are, as indicated in Fig. 4, connected together by straight lines and the sheets are bent at these lines to form shoulders, so that the surface of the sheet takes the form of a trapezoid. This shape is determinative for the sheets having a channel shaped section with shoulders formed along the edges of the web of the channel.

To give the fuselage the form diagrammatically shown in Fig. 1, the other sheets, i. e., for instance the sheets A and C which are intended to be fitted between the channel sections, must be enlarged along their edges about the amount which is lost in the sheets B by the formation of the slender trapezoid shape.

The width of the trapezoidal sheets must be broadened about the amount which, as may be seen from Fig. 6, is required for the shoulder 9 in the web 8 of the channel section, the flange 10 depending from an edge of said shoulder. This broadened portion is shown in Fig. 4 in connection with the channel 11. The smooth sheets 12 also have the enlarged or broadened form.

From the cuttings or blanks obtained in this manner, the cuttings designated 11 and 12 respectively show the final channel shaped sheets and smooth sheets respectively.

The cutting of the sheets 11, therefore, is not made along curved lines, but in the form of the trapezoid shown in Fig. 4, so that, as mentioned already above, it is not necessary according to the invention, to produce shoulders extending in plan view, in an arc or curve.

In Fig. 5, a section on line V—V of Fig. 4 is shown which represents final cross sections of the channel sheets 11 and the smooth sheets 12.

When the sheets are riveted or welded together and mounted upon the ribs or frames, a partial cross section of the fuselage appears as is shown in Fig. 6. The channelled and smooth sheets then curve both transversely and longitudinally so that they can be fitted to the shape of the ribs or frames.

The shouldering of sheets 11 is effected upon ordinary bending machines, on special presses or, if produced in quantity, by rolling.

The smooth sheets may be made with circular saws or they may be produced by subjecting them in piles to the action of horizontal saws or to the action of a recessing or shaping machine.

In case of riveting, the holes required for the reception of the rivets are bored, for instance by the use of bore patterns, whereupon the sheets are united to a shell and connected to the ribs or frames of the body in a well known manner by lap-riveting or the like.

What I claim is:

1. A tubular and longitudinally curved fuselage for an aircraft comprising a plurality of sheets each having a channel section alternately disposed between sheets each having a plain section, said sheets each being both transversely and longitudinally curved and extending longitudinally of said fuselage to form strake surface areas thereof, each channel shaped sheet having a trapezoidal surface, each plain sheet having two longitudinal edges oppositely curved with respect to each other, and means fastening the curved edges of said plain sheets to the surfaces of said channel shaped sheets.

2. A fuselage as in claim 1, shoulders extending along each longitudinal edge on said surface of said channel shaped sheets, and said curved edges of said plain sheets being seated upon said shoulders.

3. A tubular and longitudinally curved aircraft fuselage composed of a plurality of first sheets alternately disposed longitudinally of said fuselage with respect to second sheets; said first sheets each being both transversely and longitudinally curved, and comprising a strake of said fuselage having a trapezoidal shape and channel section with shoulders formed along the longitudinal edges of the outside surface of the web of said channel section, each of said second sheets being both transversely and longitudinally curved, and comprising a strake of said fuselage having a width increased from normal by an amount equal to the width of the shoulders on a first sheet, said second sheets being seated upon the shoulders of said first sheets, and means for fastening said sheets together.

WALTER RETHEL.